United States Patent
Shelon et al.

(10) Patent No.: US 8,055,570 B2
(45) Date of Patent: Nov. 8, 2011

(54) CONTROLLED DEPLETION OF A STOCHASTICALLY VARYING RESOURCE POOL

(75) Inventors: Jonathan Shelon, Natick, MA (US); Ren Cheng, Sharon, MA (US); Stephen D. Fisher, Belmont, MA (US); Peter Herlihy, Hamilton, MA (US); Ya Jin, Brookline, MA (US)

(73) Assignee: FMR LLC, Boston, MA (US)

( * ) Notice: Subject to any disclaimer, the term of this patent is extended or adjusted under 35 U.S.C. 154(b) by 51 days.

(21) Appl. No.: 12/717,296

(22) Filed: Mar. 4, 2010

(65) Prior Publication Data

US 2010/0179924 A1    Jul. 15, 2010

Related U.S. Application Data (63) Continuation of application No. 11/548,494, filed on Oct. 11, 2006, now abandoned.

(51) Int. Cl.
*G06Q 40/00* (2006.01)
(52) U.S. Cl. ........................ 705/36 R; 705/37
(58) Field of Classification Search ........... 705/36 R–37
See application file for complete search history.

(56) References Cited

U.S. PATENT DOCUMENTS

| | | |
|---|---|---|
| 2003/0006613 A1 | 1/2003 | Lof et al. |
| 2003/0046396 A1* | 3/2003 | Richter et al. ............... 709/226 |
| 2003/0236738 A1 | 12/2003 | Lange et al. |

OTHER PUBLICATIONS

International Preliminary Report on Patentability with regard to International Application No. PCT/US2007/080811 dated Apr. 23, 2009.
Ericsson, N.C., "Revenue Maximization in Resource Allocation: Applications in Wireless Communication Networks," PhD Thesis, Uppsala University Science and Technology Dept., Uppsala, Sweden, published Oct. 2004. URL: http://www.signal.uu.se/Publications/psu/a043.ps.

\* cited by examiner

*Primary Examiner* — Thu Thao Havan
(74) *Attorney, Agent, or Firm* — Fish & Richardson P.C.

(57) ABSTRACT

A method for controlling resource pool depletion includes, at a first time, determining a first remainder of a depletion interval; on the basis of the first remainder, determining a first depletion rate for urging the pool to reach a selected state at the end of the depletion interval; on the basis of the first depletion rate, partially depleting the pool; and at a second time following the first time, determining a second remainder of the depletion interval; receiving state information indicative of a difference between a state of the pool at the first time and a state of the resource pool at the second time; on the basis of the second remainder and the state information, determining a second depletion rate for urging the pool to reach a selected state at the end of the depletion interval; and on the basis of the second depletion rate, partially depleting the pool.

8 Claims, 5 Drawing Sheets

CONTROLLED DEPLETION OF A STOCHASTICALLY VARYING RESOURCE POOL

CROSS REFERENCE TO RELATED APPLICATION

Pursuant to 35 U.S.C. §120, this application is a continuation of prior U.S. application Ser. No. 11/548,494, filed on Oct. 11, 2006 now abandoned. The contents of the prior application is incorporated herein by reference in its entirety.

FIELD OF DISCLOSURE

The disclosure relates to control systems, and in particular to feedback control systems for management of a resource pool.

BACKGROUND

A control system manipulates certain variables, referred to as "control variables," associated with a controlled system. It does so in an attempt to cause the controlled system to achieve a particular goal, often referred to as a "set point." A feedback control system receives information indicative of an error between the actual performance of the controlled system and the set point. It then uses this information to manipulate the control variable in an effort to reduce this error.

A common example of a control system of this type is an automotive cruise control. In such a control system, the controlled system is the automobile, the set point is the desired speed, and the control variable is the output of the throttle. In such a case, the control system measures an error signal indicative of a difference between an actual speed and the desired speed, and controls the throttle on the basis of that signal.

Other examples of control systems seek to cause a controlled system to achieve a particular state at a particular time. For example, in the transportation industry, it is desirable for trains or airplanes to reach their destination neither too early, nor too late, but on time. In principle, one could simply measure the desired distance and operate the vehicle according to some pre-determined velocity profile. However, in practice, there will be random disturbances along the route, such as traffic, or poor travel conditions. Such disturbances can be compensated for by slowing down or speeding up in response to changing conditions. Preferably, such corrections would be carried out as unobtrusively as possible.

In other cases, a vehicle may have only limited fuel available to reach a destination. In such cases, it may desirable to control fuel consumption in such a way that when the vehicle arrives at the destination at the designated time with a designated amount of residual fuel. A control system for controlling the vehicle in such an application would adaptively control fuel consumption in response to stochastic inputs. For example, different patterns of driving will result in stochastically varying fuel consumption that may need to be taken into account in deciding how to consume the remaining fuel supply.

SUMMARY

In one aspect, the invention features a computer-readable medium having encoded thereon software for controlling depletion of a resource pool. The software includes instructions for causing a data-processing system to: at a first time, determine a first remainder of a depletion interval; at least in part on the basis of the first remainder, determine a first depletion rate for urging the resource pool to reach a selected state at the end of the depletion interval; on the basis of the first depletion rate, partially deplete the resource pool; at a second time following the first time, determine a second remainder of the depletion interval; receive state information indicative of a difference between a state of the resource pool at the first time and a state of the resource pool at the second time; at least in part on the basis of the second remainder and the state information, determine a second depletion rate for urging the resource pool to reach a selected state at the end of the depletion interval; and on the basis of the second depletion rate, partially deplete the resource pool.

In some embodiments the software also includes instructions for defining the selected state to be a fully-depleted state.

In other embodiments, the software also includes instructions for causing the data-processing system to select a depletion probability representative of the probability that the resource pool will reach the designated state at the end of the depletion interval. In such embodiments, the instructions for determining a first depletion rate include instructions for causing the data processing system to determine the first depletion rate such that the probability that the resource pool will reach the designated state at the end of the depletion interval is at least equal to the depletion probability.

Additional embodiments include those in which the software further includes instructions for causing a data processing system to urge the resource pool to reach a selected state at the end of the depletion interval by altering the composition of resources within the resource pool.

Yet other embodiments include those in which the software has instructions for causing the data-processing system to receive information indicative of financial instruments that comprise the resource pool.

Among those embodiments are those in which the software includes instructions for causing the data-processing system to receive status information that includes information indicative of a change in value of the financial instruments that comprise the resource pool, and those in which the software includes instructions for causing the data-processing system to enforce a constraint on receiving a distribution from the resource pool.

In another aspect, the invention features a computer-readable medium having encoded thereon software for causing a data-processing system to deplete a resource pool. The software includes instructions for causing a data-processing system to: define a plurality of time periods that collectively comprise a depletion interval; at the end of each time period, detect a change in the resource pool; determine a depletion rate that depends at least in part on the detected change, the depletion rate being selected to urge the resource pool to reach a selected depletion state at the end of the depletion interval; and deplete the resource pool by a depletion amount that depends at least in part on the depletion rate.

Embodiments include those in which the software has instructions for causing the data-processing system to alter the content of the resource pool in response to the detected change, the alteration being selected to urge the resource pool to reach the selected depletion state at the end of the selected depletion interval.

Additional embodiments include those in which the instructions for causing the data-processing system to deplete the resource pool include instructions for causing the data-processing system to maintain a depletion rate having a selected property.

Among the foregoing embodiments are those in which the instructions for causing the data processing system to maintain a depletion rate having a selected property include instructions for causing the data processing system to maintain a constant depletion rate, those in which the instructions for causing the data processing system to maintain a depletion rate having a selected property include instructions for causing the data processing system to maintain a depletion rate that results in monotonically increasing depletion amounts as measured by a normalized currency, and those in which the instructions for causing a data-processing system to detect a change in the resource pool include instructions for receiving information indicative of performance of constituent financial instruments of the resource pool.

Yet other embodiments include those in which the software also has instructions for causing a data-processing system to enforce a constraint on the depletion amount.

In another aspect, the invention features a method for controlling depletion of a resource pool. Such a method includes, at a first time, determining a first remainder of a depletion interval; at least in part on the basis of the first remainder, determining a first depletion rate for urging the resource pool to reach a selected state at the end of the depletion interval; on the basis of the first depletion rate, partially depleting the resource pool; at a second time following the first time, determining a second remainder of the depletion interval; receiving state information indicative of a difference between a state of the resource pool at the first time and a state of the resource pool at the second time; at least in part on the basis of the second remainder and the state information, determining a second depletion rate for urging the resource pool to reach a selected state at the end of the depletion interval; and on the basis of the second depletion rate, partially depleting the resource pool.

In another aspect, the invention features a method for depleting a resource pool, such a method includes defining a plurality of time periods that collectively comprise a depletion interval at the end of each time period, detecting a change in the resource pool; determining a depletion rate that depends at least in part on the detected change, the depletion rate being selected to urge the resource pool to reach a selected depletion state at the end of the depletion interval; and depleting the resource pool by a depletion amount that depends at least in part on the depletion rate.

The computer-readable medium can be a magnetic or optical medium, or it can be a memory. The medium need not be a single physical object at a particular location, but can be spread across different objects at different locations. For example, it may be that different processors located at different locations will carry out different portions of the procedure, in which case the instructions will have to be made available to those other processors. Accordingly, the data processing system need not be a single computer but can include several computers that cooperate with each other to achieve an intended result.

These and other features of the invention will be apparent from the following detailed description and the accompanying figures, in which:

DETAILED DESCRIPTION

Figure 1:
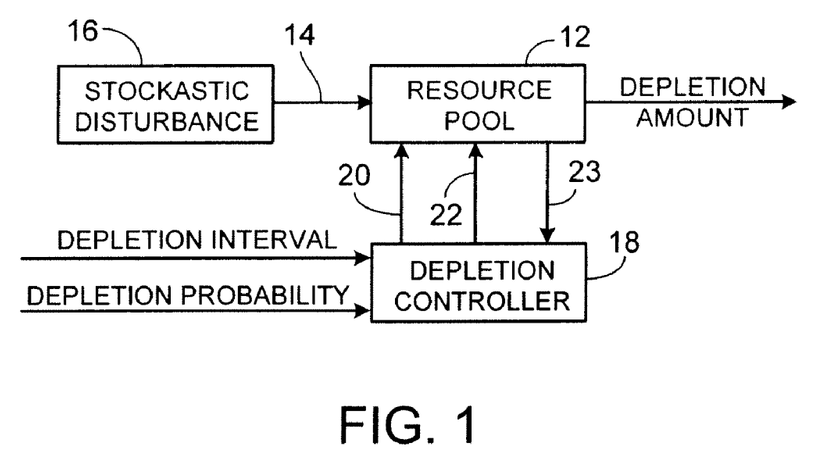
FIG. 1 shows a depletion control system for controlled depletion of a resource pool.

Referring to FIG. 1, an inhomogeneous resource pool 12 is one that includes resources of different types. For example, the resources in a resource pool 12 may be different types of fuel, such as coal and oil. Or the resources may be different types of grain to be used in connection with manufacture of foods, or different raw materials to be used in a manufacturing process. In a financial services context, the resource pool 12 may contain assets, such as different types of financial instruments, whose individual values fluctuate. In some cases, a resource pool may include, among its constituent assets, other resource pools, such as mutual fund shares. A resource pool 12 of the type described herein can also include, as a constituent asset thereof, one or more resource pools of the type described herein.

The amount, or value of resources within the resource pool 12 depends, to some extent, on a fluctuation signal 14 provided by a stochastic disturbance source 16. For example, in the case of an inhomogeneous resource pool 12 containing different types of fuel, there may be fluctuations in the consumption rate of each fuel. Or, when the resource pool 12 is a collection of one or more mutual funds, or financial instruments, the stochastic disturbance source 16 may be viewed as representing the fluctuations in the underlying markets associated with those resources. These fluctuations in market conditions, as represented by the fluctuation signal 14, cause the value of the resources in the resource pool 12 to vary in a way that forecloses complete predictability.

In many cases, one may wish to deplete a resource pool during the course of a depletion interval. For example, one may wish to have a fully depleted resource pool at the end of the depletion interval, and yet avoid premature exhaustion of resources, prior to the end of the depletion interval.

The resulting fluctuations in resource availability make it difficult to smoothly deplete the resource pool 12 during the course of the depletion interval. For example, a short term fluctuation that results in an unexpected decrease in available resources might result in a shortage toward the end of the depletion interval. Conversely, a fluctuation that results in an unexpected increase in available resources might result in an excessively parsimonious depletion rate early in the depletion interval followed by a suddenly profligate depletion rate toward the end of the depletion interval.

In response to the fluctuation signal 14, the depletion controller 18 controls the depletion rate. It does so by controlling either or both: (1) the composition of the resource pool 12; and (2) the periodic depletions of resources from the resource pool 12. It controls the former by generating a resource control signal 20, and it controls the latter by generating a depletion control signal 22.

A feedback control signal 23 includes information indicative of the state of the resource pool as well as information representative of economic indicators. In part on the basis of the feedback signal 23, the depletion controller 18 generates a resource control signal 20 that dynamically controls the underlying contents of the resource pool 12. For example, in a financial services application, the resource control signal 20 may cause re-allocation between volatile and non-volatile assets, such as between stocks and bonds, or between different classes of stocks (e.g. small-cap and large-cap stocks, common and preferred stocks, and/or domestic and international stocks), or between individual stocks. For example, the depletion controller 18 may recognize that early in the depletion interval, allocation to high-risk assets is optimal because sufficient time is available for an expected long-term growth in the value of those assets to mask short-term fluctuation caused by the volatility of such assets. Toward the end of the depletion interval, the depletion controller 18 may recognize that a shift to low-risk assets is optimal for the converse reason.

The depletion control signal 22 acts as a regulator to govern the rate at which resources are periodically depleted from the resource pool 12. When the depletion controller 18 considers there to be more than enough resource available to last until the end of the depletion interval, the depletion controller 18 causes a more rapid depletion of the resource pool 12. When the depletion controller 18 considers there to be insufficient resources to last until the end of the depletion interval, it causes a more modest depletion of the resource pool 12.

The depletion controller 18 selects both the depletion control signal 22 and the resource control signal 20 such that the resource pool 12 reaches a selected state at the end of the depletion interval, and such that the depletion rate results in a desired schedule of depletion amounts.

As used herein, "depletion amount" refers to an amount withdrawn from the resource pool. A depletion amount thus depends on a depletion rate and on the resources remaining in the resource pool at the time the depletion amount is determined.

In some embodiments, the schedule of depletion amounts is one that specifies depletion amounts that increase monotonically with time. In a financial context, where the measure of resource fluctuates with time, for example due to inflation or currency fluctuation, the depletion amounts are measured by a normalized unit, such as the value of a currency at a particular time. In such cases, the depletion amounts monotonically increase over time when measured against a normalized value of a currency.

It is not necessary that the schedule of depletion amounts specify monotonically increasing depletion amounts. Any schedule of depletion amounts can be used. For example, one might specify a depletion amount that remains constant over time. Or, one might choose a schedule that specifies small depletion amounts that then grow rapidly as one approaches the end of the depletion interval.

In many applications, the selected state of the resource pool 12 is that of complete depletion at the end of the depletion interval. However, one can also specify that the resource pool 12 retain some residual value at the end of the depletion interval.

As used herein, a normalized currency is one that is normalized to its value at a particular time. An example of a normalized currency is an inflation or deflation adjusted dollar, which is pegged to the value that it attains at a particular time.

The inputs to the depletion controller 18 include a desired depletion interval and a depletion probability, with the depletion probability representing the probability that the resource pool 12 will reach a designated depletion state at the end of the depletion interval. For example, if one were expecting to live thirty years after retirement, one might specify a thirty year depletion interval and a depletion probability of 90%.

In response to one or more of the foregoing inputs, the depletion controller 18 causes the resource pool 12 to be depleted at a rate selected such that: (1) throughout the depletion interval, the probability that the resource pool 12 will be fully depleted at the end of the depletion interval is greater than or equal to the depletion probability; and (2) throughout the depletion interval, the periodic depletion amount increases when measured in the normalized currency.

In some embodiments, the depletion controller 18 applies conventional actuarial techniques. However, in other embodiments, the depletion controller applies techniques other than actuarial techniques, such as financial, economic, heuristic investment techniques, and/or combinations thereof.

In some cases, one or more of the foregoing inputs can be set to a default value, in which case it is not necessary to explicitly provide that input to the depletion controller 18.

Figure 2:
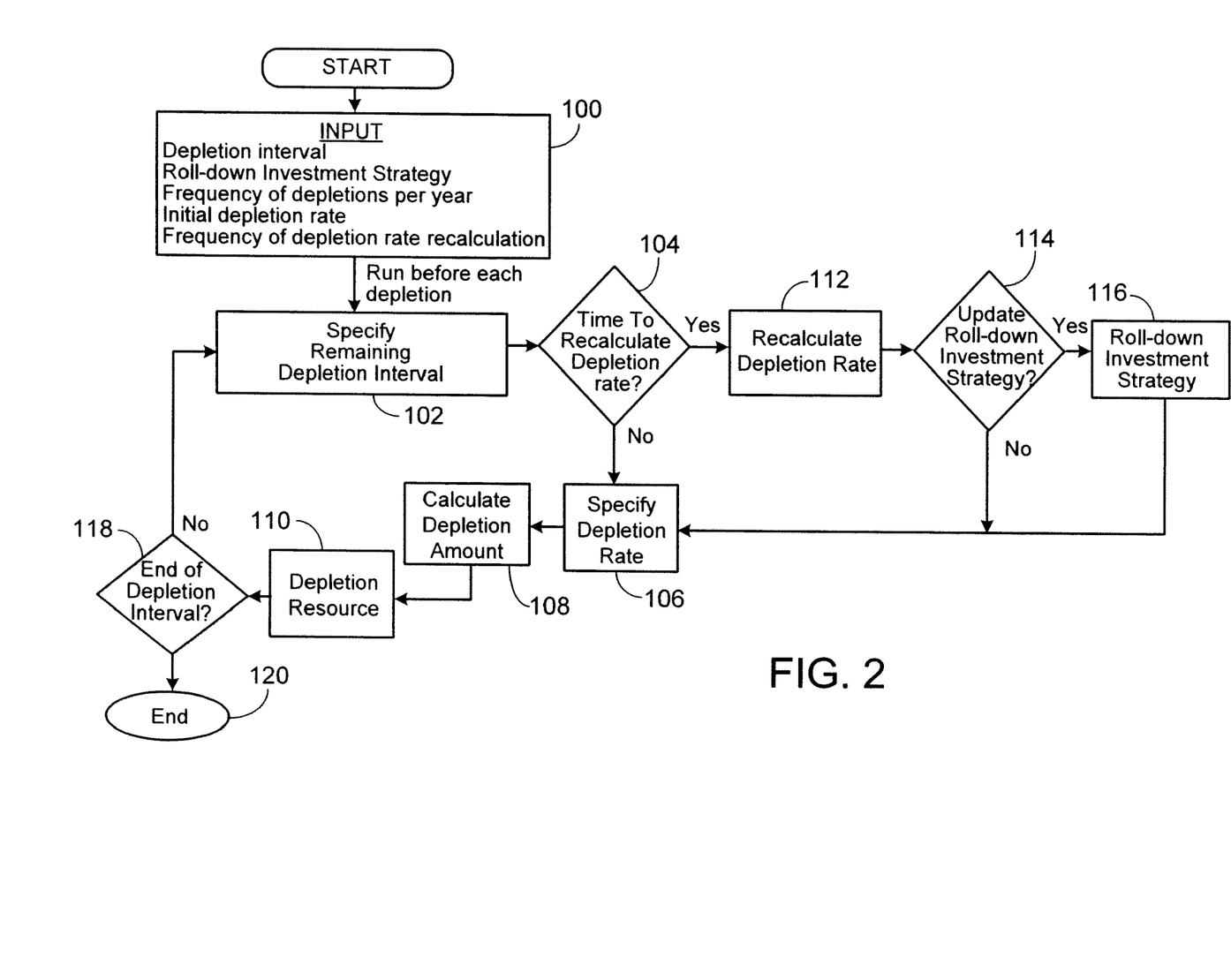
FIG. 2 is a block diagram showing the operation of the depletion control system in FIG. 1.

FIG. 2 shows an exemplary procedure carried out by the depletion controller 18 in managing the depletion of the resource pool 12. The procedure begins with the depletion controller 18 receiving inputs (step 100). These inputs include the depletion interval, or time horizon, the frequency with which periodic depletions are made. Additional inputs can include an initial depletion rate, a frequency at which the depletion rate is to be recalculated, and a desired roll-down investment strategy, which controls an initial resource-allocation between different types of resources in the resource pool.

A suitable roll-down investment strategy is one associated those funds in which asset allocation of the funds is changed over time by the fund managers in response to changing circumstances. Such funds are often referred to as "dynamic allocation funds."

An example of a dynamic allocation fund is any one of the Fidelity Freedom Funds®. Because they are geared towards saving for retirement, the Fidelity Freedom Funds® typically have an aggressive investment allocation when the investor is younger and seeks greater growth. This is because at this stage, the investor can tolerate more risk in the hopes of realizing a larger return.

As the investor ages and nears retirement, the asset allocation shifts to a capital-preserving strategy. This typically ensures that the majority of the individual's money is available for retirement and is not as affected by contemporaneous swings in the stock market.

Dynamic allocation funds thus adaptively change allocation on the basis of circumstances. In the case of the Fidelity Freedom Funds®, asset allocation changes on the basis of the individual's stage of life as the individual approaches retirement.

The method described herein can be used in conjunction with a dynamic asset allocation process, in which the asset allocation changes over time such that the corresponding resource pool is depleted over a specified interval, while the income stream from the pool is maximized. This process of dynamic asset allocation is referred to herein as the "roll-down investment strategy."

The method described herein includes providing a stream of payments based on the performance of an investment, and automatically allocating assets of the investment over time.

In another aspect, the method includes determining a first asset allocation of an investment for a first time period based on the inputs, and determining a second asset allocation of the investment, different from the first asset allocation, for a second time period based on updated inputs.

The method also includes determining the revised payment amount made for a predefined period based on the performance of the investment. This is advantageous because, in some implementations, as the time horizon shrinks, the investment strategy automatically switches from higher-risk to lower-risk assets through the use of a dynamic asset allocation investment.

In some implementations, the assets are allocated by asset type. Asset types can include domestic and international equity funds, investment-grade and high-yield fixed income funds, and short term investments like money market funds, certificates of deposit (CDs), or treasury bills (T-bills). Other investment vehicles can include alternative asset types such as real estate and private investments, or more traditional asset types such as mutual funds, commingled pools, and/or separate accounts.

In some embodiments, an asset type in the plurality of asset types with the largest percentage of assets over a period of time during existence of the investment includes domestic equities. In other embodiments, over a period of time during existence of the investment, the investment includes one or more high risk asset types, such as international equities and high yield bonds.

The depletion controller 18 begins by determining how much time remains in the depletion interval (step 102). Next, it determines if it is time to recalculate a depletion rate (step 104). If not, the depletion controller 18 retrieves the currently defined depletion rate (step 106), calculates the depletion amount (step 108) and proceeds with depleting the resource pool 12 (step 110), for example by making a payment to a designated beneficiary.

If, on the other hand, the depletion controller 18 determines that it is time to recalculate the depletion rate (step 104), then the depletion controller 18 recalculates the depletion rate (step 112). The new depletion rate is calculated using actuarial, financial, economic, and/or heuristic methods on the basis of actual fluctuations in the output of the stochastic disturbance source 16 and on forecasts of future outputs. Such forecasts can be based, for example, on inspection of leading economic indicators and on historical data concerning past performance of similar resources subjected to similar fluctuations.

The depletion controller 18 then determines if it is time to re-allocate resources within the resource pool 12 (step 114). Such a determination can be made based on the passage of time, for example semi-annually, or annually, or on the extent of the fluctuations. For example, if the controller 18 detects a 50% drop in resource value over a one month interval, there may be motivation to swiftly re-allocate resources to prevent a financial catastrophe.

If the depletion controller 18 determines that it is not time to re-allocate resources within the resource pool 12, the depletion controller 18 retrieves the currently defined depletion rate (step 106), calculates the depletion amount (step 108) and proceeds with depleting the resource pool 12 (step 110), for example by making a payment to a designated beneficiary.

If, on the other hand, the depletion controller 18 determines that it is time to re-allocate resources within the resource pool 12 (step 114), then the depletion controller 18 re-allocates resources (step 116). Like the recalculation of the depletion rate, the re-allocation of resources is determined using actuarial, financial, economic, and/or heuristic methods on the basis of actual fluctuations in the output of the stochastic disturbance source 16 and on forecasts of future outputs.

Upon completing the re-allocation of resources (step 116), the depletion controller 18 proceeds with retrieving the currently defined depletion rate (step 106), calculating the depletion amount (step 108), and depleting the resource pool 12 accordingly (step 110).

After depleting the resource pool 12 (step 110), the depletion controller 18 determines if the depletion interval has ended (step 118). If it has, the depletion controller 18 terminates (step 120). Otherwise, the depletion controller 18 returns to the step of determining how much time remains in the depletion interval (step 102).

In some cases, there exist externalities that limit or otherwise affect the depletion amount. For example, in the case of a resource pool 12 containing financial instruments, there may be tax laws that impose constraints on either the depletion amount, the depletion rate, or both.

Figure 3:
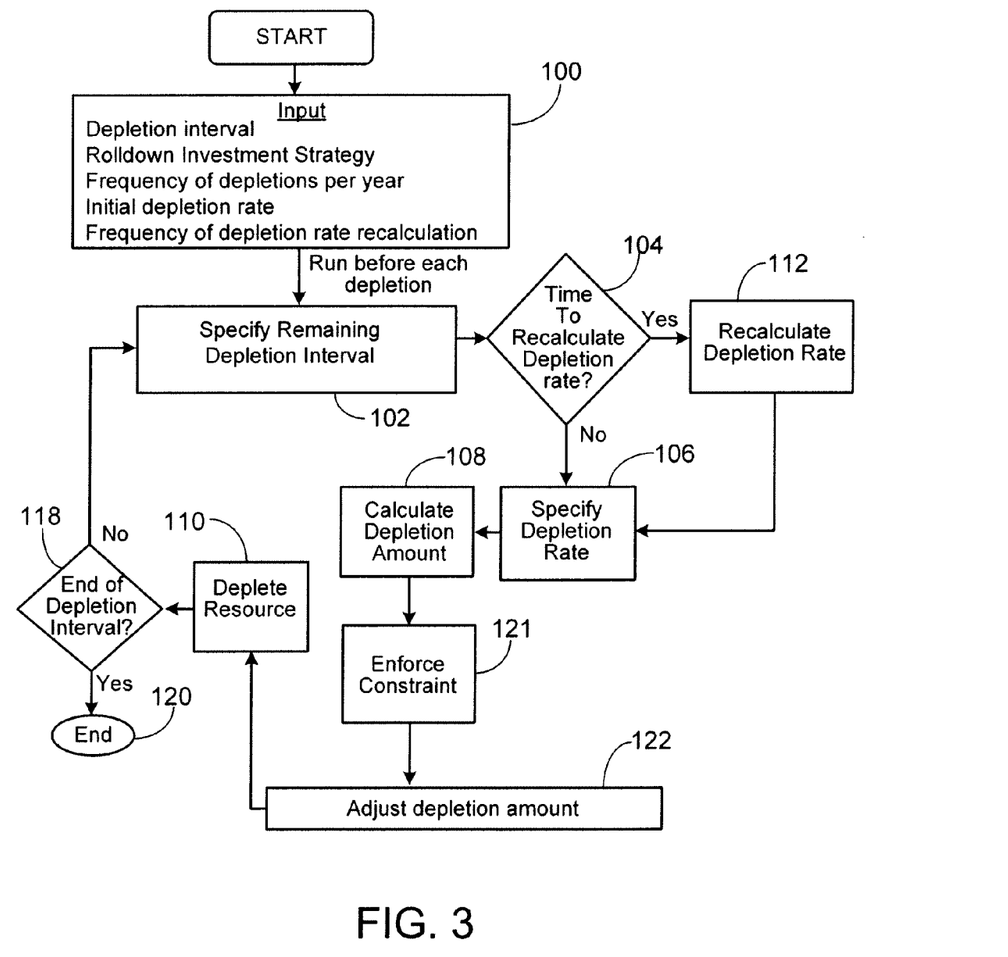
FIG. 3 is a block diagram showing the operation of the depletion control system subject to an external constraint on depletion amount.

To accommodate such externalities, an alternative implementation, shown in FIG. 3, includes receiving the output of the depletion amount calculation (step 108) and calculating any additional constraints on that output (step 121). The resulting depletion amount is then adjusted accordingly (step 122) prior to depleting the resource pool 12 (step 110).

Figure 4:
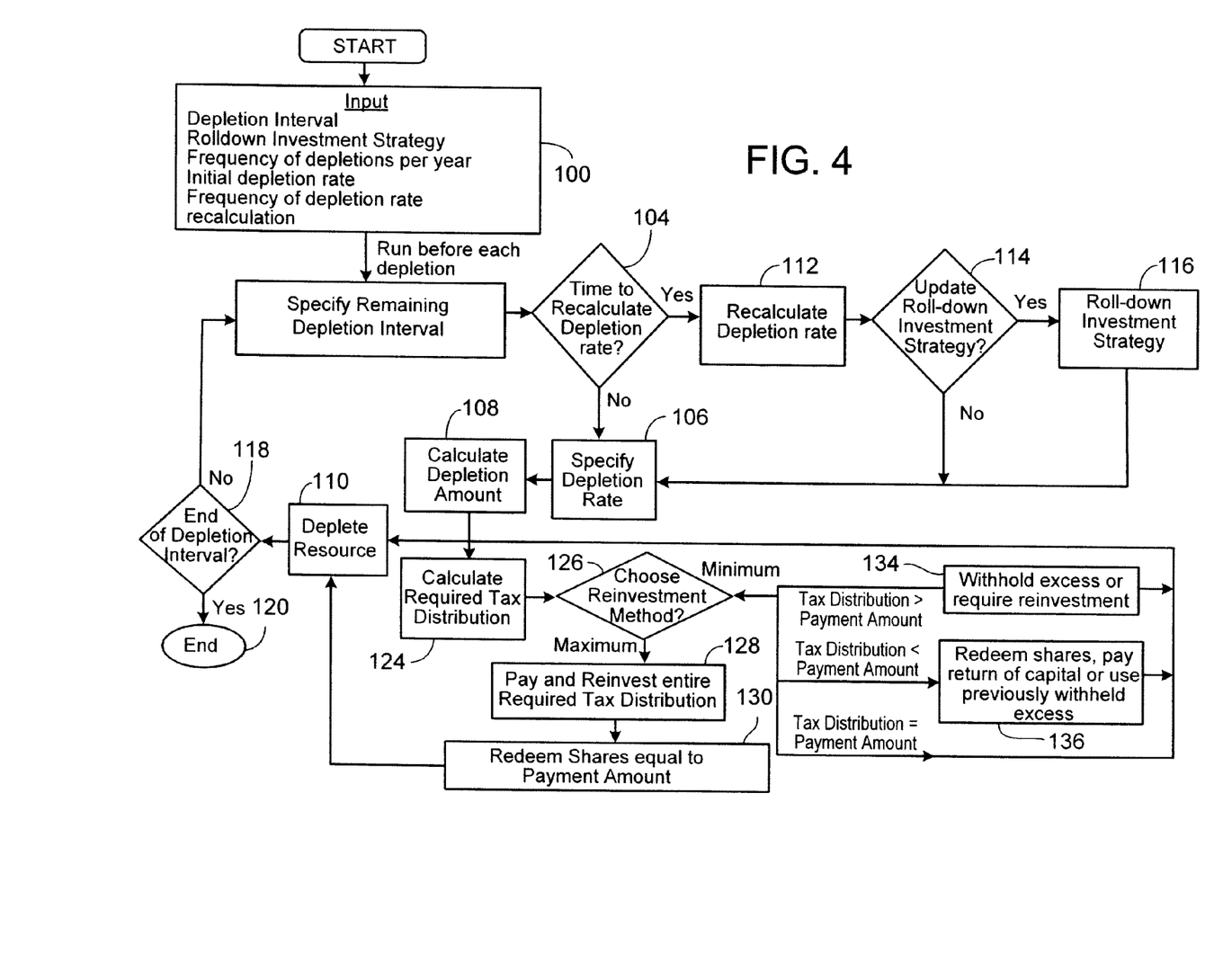
FIG. 4 is a block diagram showing an implementation of the depletion control system tailored for compliance with a particular set of external constraints.

FIG. 4 shows, in more detail, an exemplary method for calculation additional constraints (step 121) as shown in FIG. 3. The method shown in FIG. 4 features two branches, with the choice of which branch to use being made by the investor. One branch captures taxable distribution of income and capital gains, which usually occurs at periodic intervals, such as semi-annually, or monthly. A second branch provides for full re-investment of any taxable distribution, with the depletion amount being funded by a redemption of shares of the resource pool 12.

The specific details of FIG. 4 can be expected to change to in response to changes in tax laws, or in response to any additional constraints on resource distribution. For example, constraints on minimum required distributions are not accounted for in FIG. 4. However, compliance with those constraints can be carried out in a similar way.

In FIG. 4, a required tax distribution based on the proposed depletion amount is calculated (step 124). Then a decision is made as to whether to re-invest a minimum amount or a maximum amount (step 126). This decision is typically specified by the user in advance as an optional input to the depletion controller 18.

If the "maximum" option is selected, the entire amount is distributed and re-invested (step 128), in which case shares of the resource pool 12 equal in value to the payment amount are redeemed (step 130). The resulting cash is then removed from the resource pool 12 (step 110).

If, on the other hand, only the minimum amount is to be re-invested, then the next step depends on the relationship between the tax distribution and the proposed payment amount. If the tax distribution is equal to the payment amount, then the payment is simply made (step 110). On the other hand, if the tax distribution is greater than the payment amount, then any excess is withheld, or is distributed and reinvested (step 134). Finally, if the tax distribution is less than the payment amount (step 136), the depletion controller 18 redeems shares and either pays a return on capital or uses any previously withheld excesses step 134.

In those cases in which the resource pool 12 contains financial instruments and/or mutual funds, depletion amounts are selected to keep up with inflation over a specified depletion interval, or time horizon. Although any depletion interval can be selected, common depletion intervals would be 10, 15, 20, 25, and 30 years. Because the resource pool is to be depleted by the end of the depletion interval, higher depletion rates and depletion amounts are typically associated with shorter depletion intervals. Although the interval between payments can be selected arbitrarily, a typical interval is six months between payments. The payment amount, or depletion amount, is not guaranteed. However, the depletion controller 18 would periodically calibrate the depletion rate, or payment rate, to reach a specified confidence level (e.g., 90%) of reaching a desired level of depletion by the end of the depletion interval. In some embodiments, this periodic calibration would occur annually. However, other calibration periods can be specified.

An investor who provides resources in the resource pool 12 would have complete control over those resources. For example, in some embodiments, the investor can withdraw additional amounts at any time. In other embodiments, the investor can add resources to the resource pool 12. Such changes can easily be accommodated because at an abstract level, they are no different from a stochastic disturbance from the stochastic disturbance source 16. In addition, if the investor were to die before the end of the depletion interval, the resource pool 12 would be part of the investor's estate, and therefore subject to distribution.

The composition of the resource pool 12 is typically a diversified mix of investments, including mutual funds that invest in US and foreign stocks, bonds, and cash investments. The allocation between these constituent elements generally varies with time, with the composition becoming more heavily weighted toward low-risk assets as the depletion interval nears its end. In some cases, a minimum initial value for the resource pool may be imposed. A realistic minimum initial value, or initial investment, would be US$25,000, with a mutual fund expense ratio of 1% and no additional fees.

Figure 5:
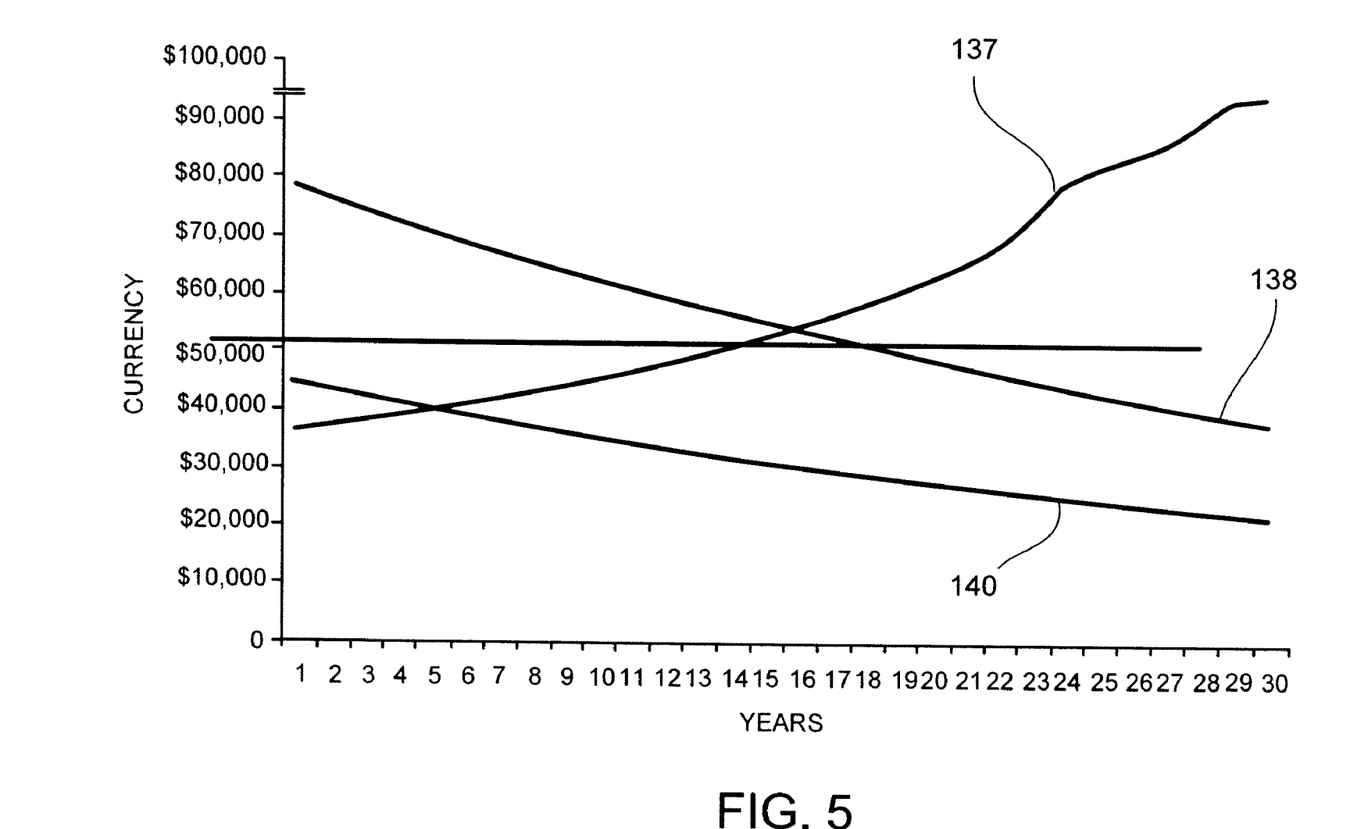
FIG. 5 compares the performance of the depletion controller with several alternatives.

FIG. 5 shows depletion amounts as a function of time graphed in a normalized currency. It is apparent that the depletion controller enables the depletion amount 137 to rise over a thirty-year depletion interval, and to do so smoothly. In contrast, a comparable annuity payment 138 monotonically decreases over the same thirty-year interval. Also shown for comparison are the interest payments 140 associated with a long-term bond.

Having described the invention, and a preferred embodiment thereof, what we claim as new and secured by Letters Patent is:

1. A computer-readable medium having encoded thereon software for controlling depletion of a resource pool, the software including instructions for causing a data-processing system to:
   at a first time,
      determine a first remainder of a depletion interval;
      at least in part on the basis of the first remainder, determine a first depletion rate for urging the resource pool to reach a selected state at the end of the depletion interval;
      on the basis of the first depletion rate, partially deplete the resource pool; at a second time following the first time,
      determine a second remainder of the depletion interval;
      receive state information indicative of a difference between a state of the resource pool at the first time and a state of the resource pool at the second time;
      at least in part on the basis of the second remainder and the state information, determine a second depletion rate for urging the resource pool to reach a selected state at the end of the depletion interval; and
      on the basis of the second depletion rate, partially deplete the resource pool.

2. The computer-readable medium of claim 1, wherein the software further comprises instructions for defining the selected state to be a fully-depleted state.

3. The computer-readable medium of claim 1, wherein the software further comprises instructions for causing the data-processing system to select a depletion probability representative of the probability that the resource pool will reach the designated state at the end of the depletion interval, and
   the instructions for determining a first depletion rate comprises instructions for causing the data processing system to determine the first depletion rate such that the probability that the resource pool will reach the designated state at the end of the depletion interval is at least equal to the depletion probability.

4. The computer-readable medium of claim 1, wherein the software further comprises instructions for causing a data processing system to urge the resource pool to reach a selected state at the end of the depletion interval by altering the composition of resources within the resource pool.

5. The computer-readable medium of claim 1, wherein the software comprises instructions for causing the data-processing system to receive information indicative of financial instruments that comprise the resource pool.

6. The computer-readable medium of claim 5, wherein the software further comprises instructions for causing the data-processing system to receive status information that includes information indicative of a change in value of the financial instruments that comprise the resource pool.

7. The computer-readable medium of claim 5, wherein the software further comprises instructions for causing the data-processing system to enforce a constraint on receiving a distribution from the resource pool.

8. A method for controlling depletion of a resource pool, the method comprising:
   at a first time,
      determining a first remainder of a depletion interval;
      at least in part on the basis of the first remainder, determining, by a computer, a first depletion rate for urging the resource pool to reach a selected state at the end of the depletion interval;
      on the basis of the first depletion rate, partially depleting the resource pool;
   at a second time following the first time,
      determining a second remainder of the depletion interval;
      receiving state information indicative of a difference between a state of the resource pool at the first time and a state of the resource pool at the second time;
      at least in part on the basis of the second remainder and the state information, determining, by a computer, a second depletion rate for urging the resource pool to reach a selected state at the end of the depletion interval; and
      on the basis of the second depletion rate, partially depleting the resource pool.

* * * * *